United States Patent [19]
Lindemann et al.

[11] Patent Number: 5,462,794
[45] Date of Patent: * Oct. 31, 1995

[54] FOAMED CORE-RECLAIM MULTI LAYER SHEET HAVING IMPROVED RESISTANCE TO BARRIER FILM DELAMINATION

[75] Inventors: David C. Lindemann, Atlanta, Ga.; Weilong L. Chiang, Naperville; Melvin L. Luetkens, Jr., Batavia, both of Ill.; Robert D. Pischke, Duluth; John C. Schubert, Marietta, both of Ga.

[73] Assignee: Amoco Corporation, Chicago, Ill.

[ * ] Notice: The portion of the term of this patent subsequent to Jul. 7, 2009, has been disclaimed.

[21] Appl. No.: 99,911

[22] Filed: Jul. 30, 1993

Related U.S. Application Data

[63] Continuation-in-part of Ser. No. 80,555, Jun. 21, 1993, Pat. No. 5,354,402, which is a continuation of Ser. No. 892,764, Jun. 3, 1992, Pat. No. 5,221,395, which is a division of Ser. No. 495,279, Mar. 16, 1990, Pat. No. 5,128,196.

[51] Int. Cl.$^6$ .................................................. B32B 3/26
[52] U.S. Cl. .................................. 428/317.1; 428/318.6; 428/319.3; 428/319.7; 428/903.3
[58] Field of Search .................................. 428/213, 317.1, 428/318.6, 319.3, 319.7, 903.3

[56] References Cited

U.S. PATENT DOCUMENTS

| | | | |
|---|---|---|---|
| 3,206,354 | 9/1965 | Pooley | 428/391.7 |
| 4,128,695 | 12/1978 | Kikuchi et al. | 428/423 |
| 4,647,509 | 3/1987 | Wallace et al. | 428/474.9 |
| 4,652,325 | 3/1987 | Benge et al. | 156/244.11 |
| 4,753,845 | 6/1988 | Sumi et al. | 428/327 |
| 4,847,148 | 7/1989 | Schirmer | 428/332 |
| 5,118,561 | 6/1992 | Gusavage et al. | 428/304.4 |
| 5,128,196 | 7/1992 | Luetkens, Jr. et al. | 428/213 |
| 5,221,395 | 6/1993 | Luetkens, Jr. et al. | 156/244.11 |

*Primary Examiner*—George F. Lesmes
*Assistant Examiner*—Blaine Copenheaver
*Attorney, Agent, or Firm*—Scott P. McDonald; Stephen L. Hensley

[57] ABSTRACT

Disclosed is a multi-layer sheet in a which a foamed thermpolastic core layer is extrusion coated with a multi-resin reclaim-containing layer, and an EVOH or acrylonitrile barrier layer is laminated to the multi-resin layer. The multi-resin layer is formulated to contain at least about 5 weight percent, and preferably about 8 to about 16 weight percent, based on the weight of the layer, of an adhesive resin to reduce the tendency of the barrier layer to delaminate from the multi-resin layer over time. The preferred adhesive is EMA.

44 Claims, 1 Drawing Sheet

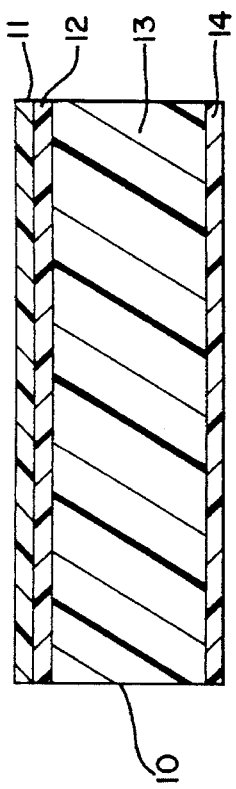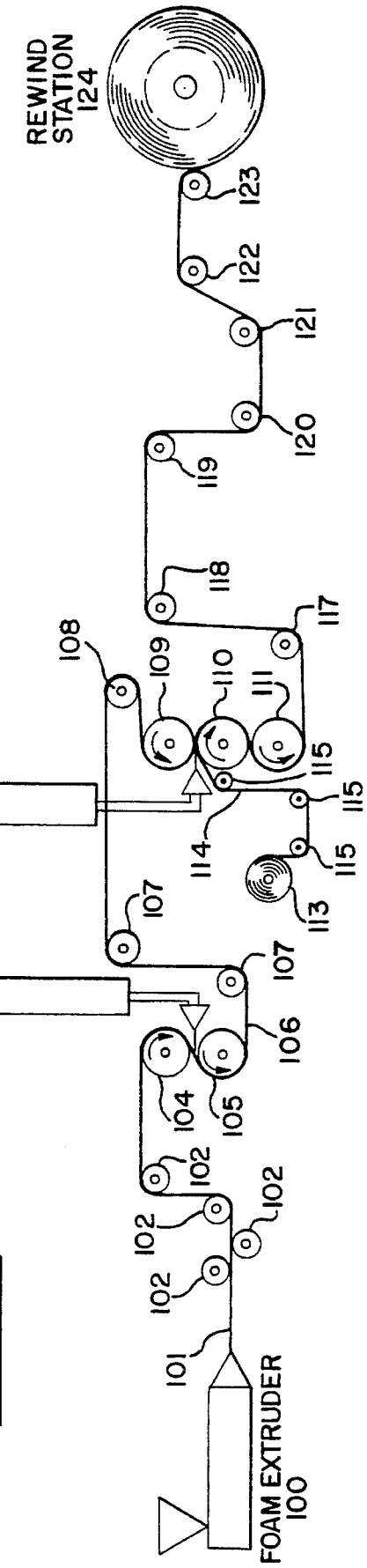

FOAMED CORE-RECLAIM MULTI LAYER SHEET HAVING IMPROVED RESISTANCE TO BARRIER FILM DELAMINATION

RELATED APPLICATIONS

The present application is a continuation-in-part of commonly assigned U.S. Ser. No. 08/080,555 (now U.S. Pat. No. 5,354,402), filed Jun. 21, 1993, which is a continuation of commonly assigned U.S. Ser. No. 07/892,764, filed Jun. 3, 1992 (now U.S. Pat. No. 5,221,395); which in turn is a divisional of commonly assigned U.S. Ser. No. 07/495,279 filed Mar. 16, 1990 (now U.S. Pat. No. 5,128,196).

BACKGROUND OF THE INVENTION

This invention relates to a thermoplastic multi-layer sheet used for production of packaging materials and, more particularly, relates to a thermoplastic multi-layer sheet having a foam core layer and a multi-resin layer preferably made with waste materials reclaimed from the multi-layer sheet manufacturing process. The multi-resin layer of the sheet is specially formulated to improve adhesion of a barrier film to the multi-resin layer.

Thermoplastic foam sheet materials, such as those made from polystyrene foam, have been used for packaging applications. These foamed sheet materials are typically made by extrusion using a blowing agent wherein polystyrene resin, for example, is heated in an extruder and is mixed in the extruder with a gaseous or volatile blowing agent and then extruded through a die and allowed to expand to form a polystyrene foam sheet. These foam sheets can be extrusion coated, for example, by the process described in U.S. Pat. No. 3,616,020 or U.S. Pat. No. 3,669,794, to add a coating or coatings to produce multi-layered foam sheets. White, U.S. Pat. No. 3,396,062, discloses a process for molding a composite foam article.

Multi-layer sheets made with various thermoplastic polymers have also been used extensively in packaging applications. Typically, these multi-layer sheets are produced by coextrusion of various plastic resins. In such multi-layer sheets, layers comprising a thermoplastic resin having oxygen barrier properties have been added to provide improved properties to the sheet. Peterson, U.S. Pat. No. 3,524,795, teaches a multi-layer packaging material employing polyolefin outer layers with an inner layer of saran which functions as an oxygen barrier layer. Other multi-layer sheets have used other resins, such as an ethylene vinyl alcohol copolymer or a polyamide, as the oxygen barrier resin. For example, Schirmer, U.S. Pat. No. 4,847,148, discloses a multi-layer sheet having a polypropylene or polyethylene outer layer, an ethylene vinyl alcohol copolymer ("EVOH") or vinylidene chloride copolymer oxygen barrier layer, an unsaturated vinyl ester bonding layer for adhesion to polystyrene, and an outer layer of polystyrene, foamed or unfoamed, adjacent the bonding layer. Nakabayashi, U.S. Pat. No. 4,576,995, discloses a multi-layer sheet with an EVOH oxygen barrier resin layer laminated between polystyrene outer layers with adhesive layers of a modified ethylene vinyl acetate copolymer. Japanese Patent Application 84012467, published Mar. 23, 1984, discloses a container made from a multi-layer structure comprising an outer polyethylene layer, an EVOH oxygen barrier resin layer, and an outer layer of one of polypropylene, nylons, polyesters, polycarbonates, polystyrenes and polyvinyl chlorides.

The production and use of these multi-layer materials often result in considerable amounts of scrap material being formed during the manufacturing operations. Accordingly, much effort has been directed towards the recycle of scrap material produced during the production of thermoplastic multi-layer sheets. However, scrap from these multi-layer materials is difficult to recycle because of the different thermoplastic compositions contained in the various layers. The different thermoplastics used often are incompatible with each other, resulting in the mixture of such thermoplastics having poor mechanical properties, such as impact strength, tensile strength, heat deflection temperature and elongation at break. For example, ethylene vinyl alcohol copolymer and polystyrene are immiscible, making recycle of scrap containing these two thermoplastics difficult.

One approach to avoid the incompatibility problem of thermoplastics contained in scrap is to blend a compatibilizer, such as a styrene-ethylene-co-butylene-styrene block copolymer like Kraton sold by Shell, with the scrap mixture. A compatibilizer, however, may not be available for the thermoplastics used. See *The International Packaging Letter*, Vol. 6, Number 516, May/June 1989 at p. 2, which states that three commercially available compatibilizers did not work for polystyrene and ethylene vinyl alcohol copolymer scrap.

Haefner, U.S. Pat. No. 3,940,001, and Schenk, U.S. Pat. No. 3,977,153, each disclose recycling of multi-layer structures wherein the individual layers are first separated to produce single component materials. This approach is difficult for structures having many layers and requires identification of what is in each layer.

Wallace, U.S. Pat. No. 4,647,509, describes a multi-layer laminate structure having a layer made of scrap from the multi-layer structure manufacturing process and a barrier layer, wherein the scrap layer is a blend of the scrap material produced during the manufacturing process with a quantity of an unused, or virgin, resin which makes up one of the other layers of the structure. Wallace does not disclose foam multi-layer sheets having a thermoplastic foam multi-layer with an adjacent multi-resin reclaim layer.

An example of a compatibilizer approach for recycling multi-layer sheets is Catte, U.S. Pat. No. 4,234,663, which describes a multi-layer foil structure which comprises a thermoplastic styrenic polymer layer and a thermoplastic olefin polymer layer bonded by an intermediary polymer layer comprising at least one layer comprising a bonding agent wherein at least one layer containing scrap produced from the multi-layer foil structure is included intermediate of the styrenic polymer and olefinic polymer layers and the scrap containing layer comprises a mixture of scrap with a graft copolymer compatibilizer in a ratio of graft copolymer to scrap of 0.2:1 to 9:1. The graft copolymer compatibilizer is described further as being a polyolefin substrate with a styrene or styrenic monomer grafted onto the polyolefin. The structures of Catte are disclosed as manufactured by a coextrusion process or by extrusion coating. Catte does not disclose foam multi-layer sheets having a thermoplastic foam layer with an adjacent multi-resin layer, nor does he disclose recycling of multi-layer sheets comprising an oxygen barrier resin. He also does not disclose a multi-resin layer comprising an oxygen barrier resin. Further, he uses the graft copolymer compatibilizer in his reclaim layer.

Bonis, U.S. Pat. No. 4,402,889, describes a process to produce a multi-layer plastic sheet comprising outer layers of "qualified" scrap material, defined as either unused virgin resin or a scrap material consisting of only one resin, and a central layer of "unqualified" scrap material having a sufficient polyolefin content to provide a moisture barrier. Bonis uses a coextrusion process wherein separate streams of the qualified scrap material and the unqualified scrap material are coextruded together through the same die to produce the multi-layer sheet.

Hungerford, U.S. Pat. No. 4,287,147, describes a process for reusing scrap material resulting from the production of a laminated film made from a polyacrylonitrile homopolymer or interpolymers. This process involves redissolving the scrap in a solvent for reuse.

Benge, U.S. Pat. No. 4,652,325, describes a method for making a multi-layer plastic structure having a substantial asymmetry in the layers of the structure, which comprises two separate coextrusions to produce two multi-layer sheets followed by combination of the two sheets to produce the structure. The two sheets are combined by being brought into contact with each other at a time when at least one contact surface of one of the sheets is still in a fluid state. In the Benge method, reclaim material is used in the coextrusion steps to produce a layer in one of the sheets. Benge, U.S. Pat. No. 4,808,482, is a division of U.S. Pat. No. 4,652,325, and is directed to an asymmetrical multi-layer structure produced by the process of U.S. Pat. No. 4,652,325. The structure is disclosed as having at least six layers: two skin polymer layers surrounding a barrier resin layer which makes up one of the sheets and two additional skin polymer layers surrounding a reclaim material layer which make up the second sheet.

Kamoda, U.S. Pat. No. 4,410,602, describes a process for producing a multi-layer laminated resin film using reclaimed resin mixture in a coextrusion process wherein a layer of the reclaimed resin mixture is entirely surrounded by a fresh resin layer. In Kamoda, the reclaimed synthetic resin mixture surrounded by fresh resin layers is used as a top and bottom laminate with an interlayer interposed between these two laminates. The fresh resin used by Kamoda is disclosed as having a decomposition temperature higher than that of the reclaim resin mixture.

Briggs, U.S. Pat. No. 4,705,708, describes a multi-layer laminate structure having a separate layer of scrap produced from several thermoplastic resins used in making the laminate structure, which is used to produce parisons for blow-molding applications.

Canadian Patent 996,018 discloses a reprocessible multi-layer laminate for food containers comprising a blend of high-density polyethylene, ethylene copolymer adhesives and polyamides wherein one layer consists of a melt homogeneous blend of polyethylene and scrap from the reprocessible laminate.

Brinkman, U.S. Pat. NO. 4,013,745, describes a polyvinyl glass film extrusion process involving use of recycle material wherein the recycle material is returned to the extruder feed.

Gusavage et al U.S. Pat. No. 5,118,561 discloses polystyrene foam core layers to which is adhered a barrier film layer the patent discloses the use of reclaim in the foam core layer in amounts from about 0.001 to about 50 weight percent.

Thiel, U.S. Pat. No. 4,086,045, describes apparatus for producing thin-walled articles comprising extrusion to produce a web of thermoplastic material. Residue from the overall process is fed back to the extrusion stage where it is mixed with fresh raw material.

An Eval Company of America (EVALCA) technical information bulletin entitled "Technical Information on GF-20" (precise publication date is unknown, but a copy was obtained by Applicants in April, 1989), states that scrap material containing EVOH has been used in multi-layer structures and discloses a method to avoid processing anomalies during extrusion of reclaim containing polypropylene and EVOH, which comprises addition of GF-20, an additive sold by EVALCA.

Reclaim material consisting of polystyrene, impact polystyrene and non-thermoplastic printing inks has been mixed in small amounts with fresh impact polystyrene and used in the extrusion coating of an impact polystyrene layer on a polystyrene foam core. The same reclaim material has also been mixed in small amounts with fresh polystyrene and used in conventional extrusion of a polystyrene foam. This reclaim material does not comprise a thermoplastic oxygen barrier resin or polyolefin.

None of the previously disclosed uses of thermoplastic reclaim material in the production of multi-layer structures have used a multi-resin layer comprising an oxygen barrier resin as an outer layer. None of the previously disclosed processes have involved extrusion coating of a thin layer of multi-resin material comprising an oxygen barrier resin onto a foam core layer. None of the prior art processes or structures have involved the combination of an oxygen barrier film as one outer layer with a foam core layer and a second outer layer comprising multi-resin material. Further, none have addressed recycle of a mixture of polystyrene, polyolefin and an EVOH oxygen barrier resin.

It is accordingly an object of this invention to provide an improved thermoplastic multi-layer structure comprising a thermoplastic foam core layer, particularly a polystyrene foam core layer. It is another object of this invention to provide a thermoplastic multi-layer sheet capable of being processed into cups and trays or other packaging articles comprising a thermoplastic oxygen barrier layer laminated onto a foam core layer and at least one multi-resin layer comprising waste material reclaimed from the multi-layer sheet manufacturing process. It is yet another object to provide a recycle method for waste material comprising polystyrene, polyolefin and barrier resins selected from the group consisting of ethylene vinyl alcohol copolymers and acrylonitrile copolymers. Still a further object of the invention is to provide a thermoplastic multi-layer sheet in which a barrier film layer of the sheet exhibits improved adhesion to a reclaim-containing multi-resin layer of the sheet, when the reclaim material in the multi-resin layer is recycled scrap obtained from the manufacture or processing of the multi-layer sheet. Other objects will appear below.

SUMMARY OF THE INVENTION

The present invention is directed to a thermoplastic multi-layer sheet comprising: (a) a core layer of foamed thermoplastic; (b) an oxygen barrier layer comprising a barrier resin selected from the group consisting of (i) copolymers of ethylene vinyl alcohol and (ii) polymers comprising a copolymer of acrylonitrile; and (c) a multi-resin layer adjacent said foamed core layer and said oxygen barrier layer, and comprising from about 5 to about 25 weight percent, and preferably about 8 to about 16 weight percent, based on the weight of said multi-resin layer, of at least one adhesive resin selected from the group consisting ethylene methylacrylate copolymer; ethylene vinylacetate copolymer; styrene-(ethylene-butylene)-styrene copolymer; styrene-maleic anhydride copolymer; ethylene-acrylic acid copolymer; styrene-butadiene-styrene copolymer; styrene-isoprene-styrene copolymer; and polybutene. The adhesive resin is preferably ethylene methylacrylate or ethylene vinylacetate, or mixtures thereof. Maleated versions of these resins are also suitable for use in the invention. The multi-resin layer is sandwiched between the foam core layer and the oxygen barrier layer, and comprises reclaim, preferably in an amount constituting at least about 30 weight percent of the layer, such reclaim being obtained from manufacture or processing of the thermoplastic multi-layer sheet.

Preferably, the foamed core layer comprises a styrenic resin, while the multi-resin layer comprises a reclaim-containing mixture of a styrenic resin and an ethylene vinyl alcohol copolymer (the latter being introduced through reclaim of the barrier film containing EVOH copolymer). The reclaim is obtained from waste thermoplastic material recycled back from the manufacture or processing of the multi-layer sheet of the invention.

Preferably, the foamed core layer also comprises the above-mentioned reclaim, in a preferred amount of up to about 40 weight percent of the foamed core layer, and preferably about 10 to about 30 weight percent. At reclaim levels below about 10 percent, the economic advantages of using reclaim in the entire multi-layer sheet of the invention are not fully realized, because maximizing reclaim usage may necessitate such high levels of reclaim in the multi-resin layer (or layers) which will detract from the overall properties of the multi-layer sheet as a whole. Excessive amounts of reclaim in the multi-resin layer can deteriorate the properties of the layer, in terms of elongation at break, resulting in multi-resin layers which tend to crack. Therefore, it is critical to balance the distribution of reclaim between the multi-resin layer(s) and the foam core layer. This can be achieved where the foam core reclaim level is the preferred level of about 10 to about 30 weight percent stated above, and the reclaim levels in the multi-resin layers are between about 30 and about 85 weight percent based on the weight of the multi-resin layers.

Hence, the reclaim levels prescribed in the present invention for both the foam layer and the multi-resin layer(s) afford a multi-layer sheet in which recyclability is maximized while maintaining excellent overall properties in the multi-layer sheet. Such properties include, with respect to the foam core layer, strength, foam density, foam cell integrity, heat distortion temperature and tensile strength; whereas in the multi-resin layer, balancing the reclaim as required in the present invention, results in multi-resin layers with good elongation at break to reduce the tendency for cracking.

The multi-layer sheet can contain an additional multi-resin layer, which is adhered to the side of the foam core layer opposite the side thereof to which the first-mentioned multi-resin layer is adhered. Where such an additional multi-resin layer is present, it may also contain reclaim such that the two multi-resin layers, taken together, have a combined amount of reclaim which is preferably at least about 30 weight percent, and most preferably at least about 60 weight percent of the total combined weight of the two multi-resin layers, but not greater than about 85 weight percent.

In one embodiment, the invention comprises a thermoplastic multi-layer sheet comprising at least three layers: a polystyrene foam core layer, preferably containing reclaim; a multi-resin layer adjacent the foam core layer comprising a mixture of at least polystyrene and EVOH barrier resin, such layer also comprising reclaim material obtained from manufacture and processing of the sheet along with the required amount of adhesive resin stated above; and an oxygen barrier film comprising the EVOH barrier resin, such barrier film being adhered to the multi-resin layer.

In another embodiment, the multi-layer sheet of the invention comprises at least four layers: the polystyrene foam core layer; a layer of a thermoplastic polymer composition having impact resistance properties, such as impact polystyrene, adhered to one side of the foam core layer; a multi-resin, reclaim-containing layer, adhered to the other side of the foam core layer and comprising a mixture of polystyrene, EVOH barrier resin, and the required amount of adhesive resin; and an oxygen barrier film comprising an EVOH barrier resin layer, said barrier film being positioned adjacent the multi-resin layer.

In another embodiment, the invention comprises a four layer sheet having the foam core layer, a first multi-resin reclaim-containing layer adhered to one side of the foam core layer and containing 5 to 25 weight percent of the adhesive resins; a second reclaim-containing multi-resin layer adhered to the other side of the foam core layer; and a barrier film layer comprising the barrier resin adhered to the first multi-resin layer. Preferably, the first and second multi-resin layer mixtures also comprise virgin impact polystyrene and, taken together, incorporate a total level of reclaim which is at least about 30 weight percent of the combined weight of both layers but not greater than about 85 weight percent. By "total level of reclaim" is meant the sum of the amount of reclaim in one multi-resin layer plus the amount of reclaim in the other, as if both layers constituted a single layer.

The multi-layer sheets of the invention can be further processed by suitable forming operations to produce containers, cups or trays, for example. Preferably, such containers, cups or trays are used, in combination with a lidding or sealing material, for packaging applications.

Briefly, the multi-layer sheet of the invention can be obtained by extrusion coating onto one side of a polystyrene foam core sheet, a layer comprising a reclaim-based multi-resin mixture of at least a polystyrene resin, and an EVOH oxygen barrier resin, where this multi-resin layer contains the required amount of adhesive resin. An second, optional, solid resin layer, with or without reclaim, can be extrusion coated onto the other side of the foam core sheet. The barrier film layer is laminated onto the multi-resin layer containing the required level of adhesive resin. An initial foam extrusion step to produce the foam core sheet can be coupled to the subsequent addition of the other layers to provide a continuous production process.

The multi-layer sheet of the invention is lightweight, strong, readily thermoformable into cups, containers and packages, and readily produced at commercially feasible rates.

BRIEF DESCRIPTION OF THE DRAWINGS

FIG. 1 shows a side view of a multi-layer foam core sheet of the invention.

FIG. 2 shows a preferred process used to produce a preferred multi-layer sheet of the invention.

DESCRIPTION OF THE PREFERRED EMBODIMENTS

The invention broadly comprises a thermoplastic multi-layer sheet having a thermoplastic foam layer and at least one multi-resin layer. The multi-resin layer preferably comprises reclaim material obtained from the sheet manufacturing process and/or from the manufacturing process for making the sheet into end-use articles, such as packaging trays, and the thermoplastic foam preferably comprises a styrenic resin. The invention also comprises three and four layer sheets, all of which comprise the thermoplastic foam layer, the multi-resin layer, and an oxygen barrier layer comprising a barrier resin. (As used herein, the term "barrier resin" means a thermoplastic resin having oxygen barrier properties as discussed below.) In the three and four layer sheets of the invention, the thermoplastic foam layer is a foam core layer and the oxygen barrier layer is an outer layer of the sheet. In the three layer sheet the multi-resin layer is a second outer layer sandwiched between the foam core and the barrier layer. In one embodiment of the four layer sheet of the invention, the multi-resin layer can be located as an inner layer in between the foam core layer and the oxygen barrier outer layer, and the second outer layer comprises an impact-resistant thermoplastic. In another embodiment, the four layer sheet comprises two multi-resin layers: one located as an inner layer in between the foam core layer and the outer oxygen barrier layer and the second located on the other side of the foam core layer as the second outer layer of the sheet. The multi-layer sheets of the invention can also comprise other layers, such as adhesive layers, in between the major layers of the sheets.

In one embodiment, the multi-layer sheet of the invention comprises four major layers: a polystyrene foam core layer; an outer multi-resin layer and an inner multi-resin layer, each comprising thermoplastic material containing a polystyrene, a polyolefin and an EVOH barrier resin and each adjacent to a separate surface of the foam core layer; and as the second outer layer, a barrier film layer comprising the EVOH barrier resin adjacent to the inner reclaim layer. FIG. 1 shows the preferred embodiment of the multi-layer sheet of the invention. Therein multi-layer sheet 10 is shown comprising four major layers. Outer multi-resin layer 14 comprises the thermoplastic reclaim material including the barrier resin. Foam layer 13 comprises preferably a styrenic foam such as polystyrene foam. Inner multi-resin layer 12 comprises preferably the same reclaim material as in outer multi-resin layer 14. The barrier layer 11 is the other outer layer of the multi-layer sheet and comprises preferably EVOH. Although the multi-layer nature of the barrier resin film 11 is not shown in FIG. 1, as discussed below, the barrier layer comprises preferably a multi-layer film to provide added properties to the barrier layer.

The foam core layer comprises preferably a styrenic foam produced using any technique sufficient to produce a stable foam from any foamable, heat-fusible styrenic resin. Techniques to produce stable foams from foamable styrenic resins, for example, by injection of a blowing agent into a polystyrene to produce an extrusion mass, which is then extruded through a die, are known to one skilled in the art. The styrenic resins useful in the foam core layer are polymers of alkenyl aromatic compounds having the general formula:

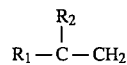

wherein $R_1$ represents an aromatic hydrocarbon radical, or an aromatic halohydrocarbon radical of the benzene or substituted benzene series, and $R_2$ is either hydrogen or the methyl radical. Resins which can be used as the styrenic foam core resin include such alkenyl aromatic compounds as the sold homopolymer styrene; alpha-methyl styrene; ortho-methyl styrene; meta-methyl styrene, para-methyl styrene; the solid copolymers of one or more of such alkenyl aromatic compounds with amounts of other polymerizable compounds such as methylmethacrylate, acrylonitrile, maleic anhydride, acrylic acid, and the like; impact polystyrene, which is a polystyrene modified by or containing elastomer moieties, such as styrene butadiene or polybutadiene; and blends of a styrenic resin such as polystyrene/poly(2,6-dimethylphenyene oxide). The choice of the foam resin will vary depending on the end-use application of the sheet of the invention. Polypropylene foams are envisioned for some applications in which consumer heating of the ultimate packaging article is desired. Preferably, however, the foam core layer of the invention is made with a polystyrene, because polystyrene is light weight, is relatively inexpensive and, exhibits higher tensile strength than polypropylene, and has sufficient temperature performance to be used in a wide variety of packaging applications.

The multi-layer sheet of the invention comprises the barrier layer made with a thermoplastic resin which has oxygen barrier properties. For packaging end-use applications, this resin is selected, in conjunction with the lidding material used in a particular package, to maintain a desired, modified atmosphere, such as, for example, a low oxygen content for meat packaging, within the package. In general, the resin used in the barrier layer has an oxygen permeability of about 10.0 or less as measured in cubic centimeters of $O_2$ permeation per mil of barrier layer thickness per 100 square inch of surface area of the barrier layer per day, measured at one atmosphere and 23° C. (hereinafter referred to as "$O_2$ permeation rate"). Preferably, the barrier resin also is processable without significant changes in the barrier resin's mechanical properties, processability or appearance at the temperatures used in extrusion coating of the particular reclaim, which generally are those from about 350° F. to about 500° F. for a polystyrene-containing reclaim. The barrier resin also must be capable, when admixed with at least two other thermoplastics such as polystyrene or polyolefins, of being extrusion coated or laminated into a thin layer without cracks onto the thermoplastic foam core. The barrier resin is selected from the group consisting of copolymers of ethylene and vinyl alcohol (referred to herein as EVOH) and polymers comprising a copolymer of acrylonitrile because EVOH and these polymers have sufficient oxygen barrier properties, yet can be recycled by extrusion coating in mixture with polystyrene and polyolefin without compatibilizers. Other oxygen barrier resins, such as saran (polyvinylidene chloride), were found by Applicants not to be recyclable in such a manner.

The polymers comprising a copolymer of acrylonitrile useful in the invention must have the oxygen barrier properties discussed above and include copolymers such as a copolymer of 70 weight percent acrylonitrile and 30 weight percent styrene and graft polymers comprising a copolymer of acrylonitrile and methylacrylate in any suitable proportion, grafted in any suitable proportions onto a butadiene elastomer. A suitable graft polymer available commercially, is sold as BAREX® by The Standard Oil Company and is 90 weight percent of a copolymer of 74 weight percent acrylonitrile and 26 weight percent methylacrylate grafted onto 10 weight percent of butadiene rubber.

Preferably, the barrier resin is an EVOH copolymer because of its excellent oxygen barrier properties in thin films. EVOH can be produced by any suitable technique such as the known saponification of an ethylene vinyl acetate copolymer. Ethylene vinyl alcohol copolymers are available commercially from EVALCA, for example, an F101 grade EVOH, and any desirable EVOH copolymer can be used having sufficient oxygen barrier properties. Blends of EVOH with other polymers such as polyethylene and any needed compatibilizing agent may also be used in the barrier layer.

Preferably, the barrier layer comprises the barrier resin contained in one layer of a thermoplastic multi-layer barrier film. Any suitable multi-layer barrier film comprising the barrier resin can be used, and such barrier films generally contain one or more adhesive or tie layers. Other layers in such films add other properties to the film, such as moisture resistance or heat sealability. Techniques for producing such multi-layer barrier films are known to those skilled in the art. Any suitable technique can be used to produce the film comprising the barrier resin. Preferably such a barrier film is produced by co-extrusion of the layers making up the barrier film.

The multi-layer barrier film used in the invention preferably comprises a layer of a polyolefin, such as polypropylene or polyethylene, or other moisture-resistant thermoplastic located on one surface of an EVOH layer of the film with an adhesive layer in between the polyolefin layer and the EVOH layer. In the preferred multi-layer sheet of the invention, on the other surface of the EVOH layer of the preferred film, is an adhesive layer adjacent the inner multi-resin layer (or the foam core layer in another embodiment of the invention). The preferred barrier film layer of the invention also has an outer surface layer of a thermoplastic selected for its heat-sealing properties for adhesion to an overwrap packaging film, adjacent the moisture-resistant thermoplastic or polyolefin. Any suitable thermoplastic such as linear low and low-density polyethylene can be used for the outer surface layer. Any suitable adhesive can be used in the tie layers in the barrier film layer, and the choice of an adhesive often depends on the particular resins in the barrier film. Preferred adhesives are maleated EVA or EMA and maleated polyolefin which are commercially available from a variety of sources. For the preferred sheets of the invention, EVA or EMA used in the barrier film should have a vinyl acetate or methyl acrylate content of about 10 to about 30 mole percent since these levels of vinyl acetate or methyl acrylate provide good adhesion without negative side effects.

With respect to the barrier layer (i.e. film) used in the present invention, such layer in the form of a multi-layer film can be one which may or may not contain polyolefins. For example, a non-polyolefin containing barrier film can contain an EVA or EMA layer for adhering the barrier film to the multiresin layer; an EVOH or acrylonitrile layer for barrier properties; and a styrenic resin to provide the barrier film with a heat-sealable layer. Styrenic layers can also be present as intermediate tie layers within the barrier film between the EVOH layer and the other layers of the film, and such styrenic layers can be maleated, as in the case of styrene maleic anhydride copolymer. Barrier films containing polyolefin heat-sealing layers are generally preferred due to the ready availability of heat-sealable films which films conveniently can be secured to a packaging article (e.g., a tray) fabricated from the multi-layer sheet of the invention, via the heat-sealable polyolefin layer of the barrier film of the sheet. However, when the barrier film comprises styrenic layers, there is envisioned the possibility of improved recyclability and improved lamination stability of the barrier film layer, when the barrier film is adhered to the polystyrene containing multiresin layer, or to the foam core layer. An example of a styrenic barrier film is one which contains the following layers: a first layer of EVA or EMA (intended for adhesion to the multi-resin layer); a second tie layer of impact polystyrene or styrene maleic anhydride compolymer; and EVOH layer; another tie layer of polystyrene or styrene maleic anhydride; and a heat-sealable layer of impact or crystalline polystyrene. A further example would be a three layer barrier film containing a first layer of styrene maleic anhydride copolymer; a second layer of EVOH copolymer; and a heat sealable layer of styrene maleic anhydride copolymer. A suitable styrene maleic anhydride copolymer is Arco's Dylark resin. Suitable polystyrene resins can be obtained from Amoco Chemical Company, Mobil or Dow.

A preferred multi-layer barrier film used as the barrier layer of the invention preferably contains in the following order, an outer heat sealable surface layer of a low-density polyethylene; an inner layer of maleated polyolefin (preferably maleated linear low density polyethylene); a layer of EVOH barrier resin; another layer of maleated polyolefin (preferably linear low density polyethylene), and finally, for the layer of the barrier film which will be adjacent the multi-resin layer, a layer of ethylene methyl acrylate (10 to 30% methyl acrylate) or ethylene vinyl acetate (10 to 30% vinyl acetate). Another preferred film used as the barrier layer of the invention preferably contains in the following order, an outer heat sealable surface layer of a low-density polyethylene; a tie layer of maleated EVA; a layer of EVOH barrier resin; another tie layer of maleated EVA, a layer of low density polyethylene; and finally, for the layer of the barrier film which will be adjacent the multi-resin layer, a layer of ethylene vinyl acetate. These preferred barrier films offer an excellent balance of properties for provision of oxygen barrier capability, adhesion, and recyclability in the multi-layer sheet of the invention.

The multi-resin layer (or layers) of the multi-layer sheet of the invention comprise the resins present in the foam core layer and the other layers of the multi-layer sheet of the invention and preferably comprise at least polystyrene and EVOH barrier resin. Reclaim material derived from production of sheets of the invention containing the preferred barrier film described above comprises about 30 to about 87 percent polystyrene, about 0 to about 46 percent impact polystyrene, about 0 to about 10 percent ethylene vinyl alcohol copolymer, about 0 to about 15 percent ethylene vinyl acetate copolymer or ethylene methyl acrylate polymer, about 0 to 20 percent polyolefin with all percents by weight of reclaim. A particularly preferred reclaim mixture, obtained from multi-layer sheet utilizing a polyolefin containing barrier film, contains: 11% LDPE, 3.3% maleated polyolefin, 3.1% EVOH copolymer, 6.1 percent ethylene methyl acrylate copolymer, 19.5 percent impact polystyrene and 57 percent crystalline polystyrene.

Although applicants reported in commonly assigned U.S. Pat. No. 5,128,196 that it was not necessary to add a compatibilizer to such reclaim material derived from the preferred sheet, and that this material could be fabricated into a multi-resin layer without cracks or holes and with adequate adhesion to polystyrene foam, it has subsequently been determined that under conditions of high temperature, extended aging or both, which can occur during storage and shipment of packaging articles embodying the present invention, there has been a tendency, albeit infrequent, for the barrier film to delaminate from the multi-resin layer. In an effort to solve this problem we have discovered in accordance with the present invention that it is critical that the multi-resin layer to which the barrier layer is adhered comprise an adhesive resin(s) in an amount of from about 5 to about 25 weight percent, and preferably from about 8 to about 16 weight percent. Suitable adhesive resins include ethylene-methyl acrylate copolymer (maleated or non-maleated); ethylene-vinyl acetate copolymer (maleated, such as Dupont's Bynel®, or non-maleated); styrene-(ethylene-butylene)-styrene copolymer; ethylene-acrylic acid copolymer; styrene-butadiene-styrene copolymer; styrene maleic anhydride copolymer (Arco's Dylark®); styrene-isoprene-styrene copolymer; and polybutene (Amoco's Indopol® polybutene). Other additives include maleated LDPE, maleated LLDPE, maleated PP, poly(p-hydroxystyrene), hydroxylated polybutene, etc. Although the multi-resin layer may contain quantities of adhesive resin from the oxygen barrier film (when the multi-resin layer incorporates reclaim that includes the barrier film composition), the introduction of this reclaim, alone, is generally not satisfactory for obtaining excellent adhesion of the barrier film to the multi-resin layer unless the adhesive level is about 5 to about 20 weight percent of the multi-resin layer, and preferably about 8 to about 16 weight percent of the layer. To achieve this level of adhesive resin in the multi-resin layer intended for adhesion to the barrier film, it will be necessary to separately add additional fresh adhesive resin to the feedstock for the extrusion line producing the multi-resin layer in those instances where the amount of reclaim going into the multi-resin layer is not sufficient to provide the levels of adhesive resins required by the present invention. The point of such addition, referring to FIG. 2, would be "extruder #2" labelled 114 in the drawing.

When using EMA or EVA as a layer in the barrier film, or as an additive for direct addition to the coextruded multi-resin layer, the preferred MA or VA content of the EMA or EVA, respectively, is from about 10 to about 30 mole percent, and most preferably from about 18% to about 27%. As the MA or VA content is reduced below about 15%, bonding capability gradually deteriorates to the point of unacceptability, whereas at increasingly higher MA or VA contents above about 28 percent, thermal instability of the EMA or EVA gradually begins to cause processing difficulties such as die lip plate out, and non-homogeneous mixing of the EMA or EVA in the extrusion mixtures. The use of EMA and EVA as the adhesive layer in the barrier film or as the direct adhesive additive to the multi-resin layer are preferred in the present invention because of the effectiveness of these materials as a bonding compatibilizer with the barrier film, and because of their processibility with polystyrene. As between EMA and EVA, EMA has been discovered to provide improved overall performance of the multi-layer sheet of the invention in terms of better thermal stability, stronger peel strength and better bonding.

Examples of commercially available adhesive resins that can be used in the barrier film, or directly incorporated into the multi-resin layer, are Mitsui's Admer maleated polyethylene, Chevron's SP 2260 (24% methyl acrylate content) or SP 2205 (20% methyl acrylate content); Dupont's Elvax grade 3170 of EVA (VA content of 18%) or 3175 (20% VA content); Quantum's Plexar grades of maleated EVA; and Dupont's Bynel maleated EVA resins.

It is preferred for excellent lamination results that the adhesive resin added directly to the multi-resin layer be the same as the adhesive resin used in the barrier film in the layer intended for adhesion to the multi-resin layer.

The thermoplastic reclaim material can be from any source for a thermoplastic reclaim material comprising a barrier resin, and preferably is derived from: a) trim scrap from the production of the multi-layer sheet of the invention, b) multi-layer sheets of the invention which are declared as waste and not processible further, or c) scrap from the process used to fabricate end-use articles from the sheet. Scrap from the manufacture of the sheet of the invention or from fabrication of the sheet into articles is preferred for the multi-resin layer because it results in a manufacturing process with minimal or virtually no thermoplastic waste. The scrap reclaim material is recovered and processed by any suitable technique, such as by grinding and blending, from either or both of the multi-layer sheet production process and from any thermoforming or other subsequent processing of the multi-layer sheet.

During the production of the multi-layer sheet of the invention, the amount of scrap generated will generally reach a steady state level when total recycling of scrap produced from the sheet production is utilized. The steady state level, of course, will vary from operation to operation given the total amount of sheet material produced. Where the multi-layer sheets of the invention are processed or formed into articles at the sheet production site, the level of scrap generally will run in the range of about 30 percent to about 60 percent of the total amount of sheet produced. Where the sheets are not fabricated on-site, the level of scrap is generally about 5 to about 20 percent. Scrap levels of about 5 to about 60 percent are readily handled in the production of the reclaim-containing sheets of the invention.

The amount of scrap material generated during manufacture of the multi-layer sheet can, though need not, determine which embodiment of the multi-layer sheet is selected. For example, where the amount of scrap is large, sheets containing both inner and outer multi-resin reclaim layers can be produced to use up the scrap. Where lesser amounts of scrap are available, sheets containing only the inner reclaim layer can be produced.

Other, fresh resins can be added to the reclaim material to provide improved properties to the sheet. For example, in a multi-layer sheet of the invention comprising a polystyrene foam core, it is preferred to add a virgin impact polystyrene having an Izod impact strength, as measured by ASTM D-256, of about 0.5 to about 4.0 (an example of which is H2R, available from Amoco Chemical Company) to the reclaim material used in the multi-resin layer to improve its impact resistance, particularly for sheets with an outer multi-resin layer. Such a blend of reclaim material and impact polystyrene is generally in the range of about 15 percent impact polystyrene to about 70 percent impact polystyrene and about 85 percent reclaim material to about 30 percent reclaim material (the percents are by weight of total reclaim). Although it is not necessary to add an additional resin, such as the impact polystyrene, to the multi-resin layer sandwiched between the foam core and the barrier layer, it is preferred to do so because this provides additional strength to the sheet and permits use of one feed source for extrusion coating of both the inner and outer multi-resin layers. Where fresh impact polystyrene is added to the reclaim material, some impact polystyrene is already present in the reclaim material and the overall impact polystyrene content in the multi-resin layer is preferably about 10 percent to about 50 percent by weight.

The multi-layer sheets of the invention can be produced in any convenient thickness and generally are about 30 mils to about 250 mils thick, since sheets below 30 mils may lack sufficient rigidity and sheets above 210 mils cannot be easily thermoformed into packaging articles. The preferred four major layer sheet of FIG. 1 is in the range of about 60 mils to about 150 mils thick, since sheets of these thicknesses have sufficient strength and rigidity for packaging applications. The multi-resin reclaim layers 12 and 14 may be the same or different thickness and are preferably each in the range of about 1.0 mil to about 7.0 mils thick, because layers of these thicknesses are easily produced by extrusion coating and typically use all sheet scrap from the manufacturing process. More preferably, the multi-resin layers are about 2.0 to about 4.0 mils thick because it is easier to maintain thickness uniformity for this range of thickness. It was unexpected that the multi-resin reclaim layer containing a polystyrene, an EVOH barrier resin and a polyolefin and having a thickness of about 1.0 to about 7.0 mils could be extrusion coated onto the polystyrene foam core without the addition of a separate adhesive layer between the reclaim layer and the foam core because these three resins are incompatible and mixtures of them would not be expected to exhibit good adhesion to another thermoplastic layer. The thickness of the foam core layer may vary depending upon the requirements, for example, rigidity, of the end-use application of the sheet. Preferably, the foam core layer in the finished multi-layer sheet will be in the range of about 45 mils to about 100 mils thick. The barrier layer preferably comprises a film having an overall thickness of about 1 to about 5 mils and more preferably is about 2–3 mils, as multi-layer EVOH barrier films having adequate oxygen barrier properties can be prepared in these thicknesses.

The foam core reclaim multi-layer sheets of the invention are produced by a process preferably comprising extrusion coating the reclaim material onto each of the upper and lower surfaces of a plastic foam layer. The multi-layer sheets of the invention also may be produced by coextrusion; however, process control limitations in the co-extrusion of a foam layer and a coating layer make obtaining commercial production rates with conventional co-extrusion equipment impractical. The extrusion coating of the multi-resin reclaim layers may be done with any known coating technique, and preferably is done using the method of U.S. Pat. No. 3,616,020. Hence, the reclaim material recovered from manufacturing operations if flaked and pelletized to a desirable size and is mixed with impact polystyrene in the desired amount to produce the reclaim material feed. The size of the reclaim material after the initial processing is not believed critical. The reclaim feed is then melted by heating to a temperature of about 350° F. to about 500° F. in the extruder and then coated in the desired thickness onto the foam core. The reclaim material used in the extrusion coating is also preferably processed to reduce solid content in the melted reclaim material stream. This is done to guard against solids present in the reclaim melt stream causing holes in the reclaim layer. Solids present in the reclaim melt can come from decomposition, cross-linking, gel formation or other reactions of resins present in the reclaim stream. The processing to reduce solids content can be accomplished by screening the melt through an appropriately sized screen, such as a screen located in the extruder, and/or by adding an additive, such as GF-20, available from EVALCA, to deactivate residual catalyst present in the reclaim which can decompose the EVOH.

Preferably the method further comprises laminating the barrier film layer onto one multi-resin layer to produce the preferred multi-layer foam core sheet of the invention. The barrier film layer can be laminated by any known method, such as by contacting an adhesive layer of the barrier film layer with the inner multi-resin layer or the foam core layer.

A more preferred method of the invention comprises extruding a polystyrene foam core layer having an upper and lower surface; extrusion coating a multi-resin reclaim layer having a thickness of about 1 to about 7 mils consisting essentially of ethylene vinyl alcohol copolymer, ethylene vinyl acetate copolymer, linear low-density polyethylene, polypropylene, polystyrene and impact polystyrene onto each of the upper and lower surfaces of the foam core layer to produce a foam core-reclaim sheet having a foam thickness about 60 to about 150 mils; and laminating a barrier film layer comprising layers of ethylene vinyl alcohol copolymer, ethylene vinyl acetate copolymer, linear low-density polyethylene, and polypropylene onto one multi-resin reclaim layer to produce a foam core multi-layer sheet.

Any suitable technique can be used to produce the foam core layer, the choice of which will vary depending upon the precise foam used. When using a polystyrene foam, it is preferred to produce the foam by conventional extrusion of an extrusion mass comprising polystyrene and suitable amounts of a physical blowing agent comprising an aliphatic hydrocarbon such as butane or propane and a nucleating agent such as talc.

Another embodiment of the method of the invention comprises an improvement in the foam extrusion step of the preferred method discussed above. In this embodiment, the reclaim material comprising the barrier resin is actually combined with the foam resin and the mixture of reclaim and foam resin is then foamed. This method is used preferably where the amount of reclaim material produced during the multi-layer sheet manufacturing process exceeds the amount which can be utilized in the reclaim layers. Generally, the amount of reclaim in the foam should at under about 40 weight percent. It was unexpected that a mixture of foam resin and the reclaim material comprising the barrier resin could be foamed to produce an acceptable foam. A preferred range of reclaim in the foam core layer is from about 10 to about 30 weight percent based on the weight of the foam core layer based on a deterioration in foam properties which generally has an onset at levels of reclaim exceeding about 35–40 weight percent. Above about 40 weight percent reclaim, the non-styrenic components of the reclaim mixture begin to adversely affect the ability to produce foams having densities in the range of about 3–4 pcf with good cell structure.

In this embodiment, the reclaim material is flaked and pelletized and is mixed with the desired amount of the desired foam resin, such as one of those used to produce the foam core layer of the multi-layer sheet of the invention, and with any desired cell control or nucleating agent or with other desired additives, such as fire retardants, and is fed to an extruder. Any known blowing agent, for example, an aliphatic hydrocarbon such as propane or butane, $CO_2$, nitrogen or hydrochlorofluorocarbons, which produces a stable foam having a desired cell size from the foam resin can be used to foam the reclaim material/foam resin blend. For producing foams used in packaging applications, a blowing agent comprising an aliphatic hydrocarbon is preferred. It is also possible to use blowing agent mixtures such as carbon dioxide mixed with lower alkanes. The amount of blowing agent by weight of the resin and reclaim feed can be any desirable amount and preferably is about 2.0 to about 12.0 weight percent.

For a reclaim material comprising EVOH, polyolefin, EVA, polystyrene and impact polystyrene mixed with polystyrene as the foam resin, the amount of added talc nucleating agent is about 0.5 to about 2.0 parts per 100 parts by weight resin plus reclaim, and the amount of blowing agent is about 2.0 to about 6.0 parts by weight per 100 parts by weight fresh resin plus reclaim. For this reclaim material and polystyrene mixture, a blowing agent comprising butane gives good results. It should be noted that foaming a mixture of reclaim material and a foam resin has applications besides the production of the sheet of the invention. Foam produced by foaming such a mixture may be used for other purposes, such as for insulation.

FIG. 2 is a drawing showing the more preferred method of the invention. Foam extruder 100 is shown producing a polystyrene foam by extrusion through an annular die. The extruded foam is then slit and flattened to produce a polystyrene foam core sheet 101 which is sent through tension control rollers 102 to extrusion nip rollers 104 and 105, for extrusion coating of multi-resin reclaim material from extruder 103 onto one layer of the foam core. The nip rollers 104 and 105 have a clearance between them, commonly referred to as the nip, which causes the reclaim material and the polystyrene foam core to be compressed. In practice, the nip pressure must be adequate to compress the reclaim layer into the foam core substrate. Such a pressure is that generally sufficient to compress the foam core layer to about one-half or more of its original thickness of about 80 to about 180 mils. The tension on the foam sheets during the extrusion coating steps should be carefully controlled to ensure a wrinkle-free product. The nip roller 105 is also chilled to cool the one-side coated sheet. The one-side coated foam core layer 106 is then sent to reverse rollers 107 and 108 in preparation for coating of the other side. It then goes to nip rollers 109 and 110 where an additional multi-resin reclaim layer from extruder 112 is coated on the other surface of the foam core sheet. The temperature and line speed conditions disclosed in U.S. Pat. Nos. 3,616,020 or 3,669,794, which are incorporated by reference, are used in the extrusion coating of the reclaim layers onto both surfaces of the foam core. For the preferred reclaim material comprising EVOH, ethylene vinyl acetate copolymer, polystyrene, impact polystyrene, polypropylene and linear low-density polyethylene, the extrusion temperature is about 350° F. to about 500° F. The line speeds attainable vary with sheet thickness and will be in the range of about 20 to about 100 feet per minute. For a 70 mil thick sheet, the line speed will be about 60 to about 70 feet per minute.

Next, a barrier film layer 114 comprising the barrier resin is taken from roll 113, through guide rollers 115, and is laminated onto the reclaim layer at nip rollers 109 and 110 to produce the multi-layer sheet 116 of the invention. Sheet 116 then passes through another nip between rollers 110 and 111 and then by guide rollers 117 to 123 to roll-up at rewind station 124. The last roller 123 is a pressure roller for maintaining tension on the sheet. The rolled sheet is then ready for shipment to another processing site or can be thermoformed or shaped into articles at the same location.

Applicants prefer the method shown in FIG. 2 involving film lamination of the barrier film layer to the reclaim-foam core sheet immediately after extrusion coating of the reclaim layer while the reclaim layer is still hot, over attempting to laminate a preheated barrier film layer to a preheated foam core sheet. In trials, Applicants had difficulty achieving sufficient lamination of the preferred barrier film layer of the invention to the foam core sheet using a three nip roller stack (such as rollers 109, 110 and 111) where the rollers were heated at 180° F. and before lamination the foam core sheet and the barrier film were at room temperature.

In the method of FIG. 2, Applicants found that, to achieve a wrinkle-free sheet 116 at commercially viable line speeds of about 60 to about 70 feet per minute, rollers 110 and 111 must be maintained at a temperature below about 150° F. and roller 109 should be in the range of about 80° F. to about 110°. If the rollers are too hot, i.e., outside the above conditions, wrinkling of the film layer cannot be eliminated. Preferably, rollers 110 and 111 are maintained about 120° F. to about 150° F. The nip between rollers 109 and 110 and between rollers 110 and 111 is preferably about 30 to about 40 mils, and more preferably about 35 to about 38 mils to achieve good lamination.

In another embodiment, the method of the invention comprises initial production of a multi-layer sheet, which has no mutli-resin layer or layers, until enough scrap is generated in the production method to be used to produce reclaim containing sheets. In this embodiment, a multi-layer sheet comprising: the preferred barrier film layer of the mutli-resin layer sheet of FIG. 1, an inner layer of impact polystyrene adjacent the barrier film layer, a foam polystyrene core layer adjacent the inner layer, and an imact polystyrene outer layer adjacent the other surface of the foam core layer is produced initially by the method of FIG. 2. In the initially produced sheet the impact polystyrene inner and outer layers are extrusion coated in thicknesses of about 1.0 mil to about 7.0 mils onto the polystyrene foam sheet, in place of the inner and outer multi-resin layers, to produce the foam sheet and the barrier film layer is then laminated onto the foam sheet to produce a non-reclaim-containing multi-layer barrier foam sheet. When enough scrap is collected from the initial production steps, either or both the inner or outer impact polystyrene layer are replaced with a multi-resin reclaim layer to produce a reclaim-foam sheet, and the barrier film layer is then laminated onto it to produce the reclaim-foam core multi-layer sheet. Furthermore, when scrap levels are depleted, production of the sheets without reclaim can be resumed. Thus, this embodiment provides great flexibility in disposal of scrap during manufacturing of multi-layer barrier sheets and results in a continuous production process of multi-layer foam barrier sheets, either with or without multi-resin reclaim layers.

The multi-layer sheets of the invention can be processed and shaped by any suitable process, and preferably by known thermoforming processes, to produce various articles, which will generally have bottom and side walls. Exemplary articles include trays, bowls and cups. The invention thus comprises articles produced from the multi-layer sheets of the invention, and such articles have particular application in the food packaging and medical packaging industries. Preferably, trays, cups and bowls used for food packaging or food contact are fabricated from the preferred multi-layer sheets of the invention so that the barrier film layer is the interior surface, i.e., the food contact surface, of the article.

The invention is described further in the following examples.

EXAMPLES 1–5

Three samples of different resin blends were prepared as follows. All percents (%) shown are weight percents. The resin blends simulated reclaim material from multi-layer sheets made with a five layer (LLDPE/PP/EVA/EVOH/EVA) barrier film.

Blend 1 was produced by compounding 500 lbs total of 50.1% crystal polystyrene (Amoco Chemical company R1), 32.7% high imact polystyrene (Amoco Chemical Company H2R), 5.5% PP (7853-367 available from Eastman Kodak), 3.0% LLDPE (Dow chemical 3010), 2.1% EVA (Plexar 3342 available from Chemplex), 1.6% EVOH (F101 grade available from EVALCA) and 5.0% Kraton G2701 (a styrene-ethylene-co-butylene-styrene block copolymer available from Shell) on a conventional ZSK-30 single screw extruder and extruding the compounded blend at a temperature of about 432° F. through a one hole die at 25 lb/hr initially and then through a two hole die at 45 lb/hr. Blend 1 simulates a reclaim from a multi-layer sheet manufacturing process to which a compatibilizing agent (Kraton) is added.

Blend 2 was produced by compounding 250 lbs. total of 63.1% crystal polystyrene, 21.6% impact polystyrene, 6.9% PP, 3.8% LLDPE, 2.6% EVA and 2.0% EVOH on the same extruder using the same resins and processing conditions as used to make Blend 1. Blend 2 simulates a reclaim from utilization of trim scraps from a multi-layer laminate manufacturing process.

Blend 3 was made by first extruding, at a temperature of 420° F., through an annular die, a mixture of plystyrene resin (Amoco R1), 4.0 parts butane per 100 parts resin and 1.0 parts talc per 100 parts resin, to produce a foam sheet having a density of 3.4 lbs/ft$^3$. The foam sheet was then extrusion coated on one surface with a 2 mil thick layer of imact polystyrene (Amoco H2R). A five layer LLDPE/PP/EVA/EVOH/EVA barrier film of 16.5 wt % EVA, 16.5 wt % EVOH, 42.8 wt % PP and 24.2 wt % LLDPE, made by co-extrusion of the resins of Blend 1, was then laminated onto the other surface of the foam sheet by passing through two nip rollers having a nip of about 35 mils. The foam layer was 70 mils thick after lamination. The barrier film/foam sheet was flaked and pelletized, and extruded on an 8-inch Sterling extruder at a temperature of 440° F. to produce Blend 3, which simulates reclaim from complete recycle of a barrier layer/foam sheet. The composition of Blend 3, on a weight % basis, was 45.6% polystyrene, 30.8% impact polystyrene, 3.9% EVOH, 3.9% ethylene vinyl acetate, 10.1% polypropylene and 5.7% linear low-density polyethylene.

The mechanical properites of each Blend, for comparison to those of an Impact Polystyrene (IPS), are in Table 1. The IPS was extruded on a Brabender extruder at 285° F. As is seen in Table 1, the mechanical properties of each of the Blends were similar to those of the IPS control sample.

TABLE 1

| Property | Material | | | |
|---|---|---|---|---|
| | IPS | Blend 1 | Blend 2 | Blend 3 |
| ASTM D-648 Heat Deflection @ 66 psi | 201 | 199 | 199 | 228 |
| ASTM D-2256 Izod Impact (ft-lb/in) | 1.2 | 0.8 | 0.4 | 0.4 |
| ASTM D-1822 Tensile Impact Strength (ft/lb/in$^2$) | 35 | 25 | 21 | 21 |
| ASTM D-790 Flex Modulus (mpsi) | 330 | 326 | 410 | 324 |
| ASTM D-638-1 Break Strength | 4.1 | 3.2 | 5.7 | 4.5 |
| % Elongation @ Break | 18.3 | 39.3 | 2.8 | 3.9 |

Heat deflection was measured by ASTM D-648; Izod Impact by ASTM D-256; Tensile Impact Strength ("TIS") by ASTM D-1822; Flex Modulus by ASTM D-790; and Break Strength and Elongation at Break by ASTM D-638-1.

Multi-layer sheets were prepared by extrusion coating each of the Blends and the IPS control onto a plystyrene foam sheet and then laminating a 3.0 mil thick, EVOH barrier film as used in Blend 3 onto the coated foam sheets in the following configurations:

Example 1: four major layers total—Blend 1/Foam/Blend 1/Barrier Film (The blend layers were each about 2.0 mils thick.)

Example 2: three major layers total—Blend 1/Foam/Barrier Film (The blend layer was about 2.0 mils thick.)

Example 3: four major layers total—Blend 2/Foam/Blend 2/Barrier Film (The blend layer was about 2.0 mils thick.)

Example 4: three major layers total—Foam/Blend 3/Barrier Film (The blend layer was about 2.5 mils thick.)

Example 5: four major layers total—IPS/Foam/Blend 3/Barrier Film (The IPS layer was about 2.5 mils thick, and the blend layer was 2.0 mils thick.)

The polystyrene foam layer in each case was produced by extruding on a 4 ½" to 6" NRM extruder, a mixture of Amoco R1 polystyrene, 4.0 parts butane per 100 parts by weight resin and 1.0 parts talc per 100 parts by weight resin through an annular die at 420° F.; the resulting foam was then slit to produce a foam sheet having a density of 3.4 lb/ft$^3$. The blends and IPS layers were extrusion coated in the above thicknesses onto the foam core using a Johnson extruder to extrudate the blends at a temperature of about 440° F. The barrier film was laminated by passing the film and the rest of the structure through a stack of three nip rollers having a nip of about 35 mils. The top roller was at 110° F. and the middle and bottom rollers were at 130° F. In each case, the foam core was 70 mils thick.

The adhesion between the foam layer and the blend layers in each of Examples 1–5 and between the IPS and foam layer in Example 5 were measured by the method in ASTM D-229-82. The results are in Table 2.

TABLE 2

| Example | Adhesion (lb) |
|---|---|
| 1 | 0.71 |
| 2 | 0.71 |
| 3 | 0.22–0.45* |
| 4 | 0.47 |
| 5 | 0.42 (Blend), 0.38 (IPS) |

*Variation due to inadequate manufacturing process control.

As is seen by comparing the adhesions in Table 2, the adhesion of the multi-resin blend layers to the foam layer in Examples 3, 4 and 5 (each of which did not contain the Kraton compatibilizer) exceeded the adhesion of the IPS layer to the foam layer in Example 5. Thus, a blend comprising ethylene vinyl alcohol, polypropylene, polystyrene, impact polystyrene, ethylene vinyl acetate and linear low-density polyethylene can be adhered to a polystyrene foam core without an added adhesive layer and without adding a compatibilizing agent to the reclaim material.

The sheets from Examples 1–5 were each also thermoformed successfully into packaging trays, with the barrier film layer as the interior surface of the trays.

During some attempts at extrusion coating of the sheets of Examples 1–5, it was observed that holes were formed in the reclaim layer due to the presence of small solid particles, believed to be decomposed barrier resin, in the melt. Thus, production of the multi-layer, foam-multi-resin layer sheets of the invention, should involve processing of the reclaim, before extrusion coating onto the foam core, to remove solids from or prevent solid formation in the multi-resin mixture.

EXAMPLES 6–10

Extrusion feed samples of Blend 3 and polystyrene resin (Amoco Chemical R1) were prepared as set out in Table 2:

TABLE 2

| Example No. | Blend 3 (% by wt) | PS Resin (% by wt) |
|---|---|---|
| 6 (Control) | 0 | 100 |
| 7 | 10 | 90 |
| 8 | 20 | 80 |
| 9 | 30 | 70 |
| 10 | 40 | 60 |

Each of the feeds of Examples 6–10 were then mixed with 1.0 parts talc by weight per 100 parts feed and 4.0 parts by weight butane per 100 parts feed in a 4 ½" to 6" NRM extruder and extruded at a temperature of 440° F. through an annular die and then slit to form a foam sheet. The foam extrusions were performed at the following die pressures, in psi: Ex. 6-1980, Ex. 7-1953, Ex. 8-1943, Ex. 9-1958, and Ex. 10-1858. The extrusion run speeds were 68 ft/min for Ex. 6 and 72 ft/min for Ex. 7 through 10. The resulting foams were analyzed, and the results are in Table 3.

TABLE 3

| Example No. | Density (lb/ft$^3$) | Thickness (mils) | Cell Size |
|---|---|---|---|
| 6 | 3.8 | 101 | 5.9 |
| 7 | 4.6 | 85 | 4.5 |
| 8 | 4.3 | 93 | 4.9 |
| 9 | 4.3 | 93 | 4.9 |
| 10 | 4.2 | 91 | 4.8 |

Each of the foams produced in Exmaples 7–10, from fresh resin-blend mixtures was acceptable and was comparable to that of the control foam of Example 6.

The foams produced were also successfully thermoformed into trays. The foam sheets of Ex. 6–10 were each first extrusion coated with a 2 mil thick impact polystyrene (Amoco H2R) layer. The thermoforming of the coated sheets from each of Examples 6–10 was done under identical conditions with a conventional thermoforming process. The thermoforming conditions were: top zone-550° F., bottom zone-700° F., cycle time-7.0 seconds, and index length-22.0 inches.

The trays formed from sheets of foams made from higher levels of Blend 3 had greater shrinkage, with those from Example 10 (40% reclaim) having 25% shrinkage in both machine and transverse directions. However, no significant loss of properties were seen in any of the trays. The trays made from a blend of resins were as thick, as strong and as microwaveable as trays made without a blend of resins.

EXAMPLE 11

A mixture of Blend 3, 80% by weight, and imact polystyrene, 20% by weight (Amoco H2R), was extrusion coated onto a polystyrene sheet by extrusion at 440° F. onto a polystyrene foam sheet produced like the foam sheet produced in Example 6. The adhesion between the blend/impact polystyrene layer and the foam layer was measured as 0.34. This level of adhesion is sufficient to not require an adhesive layer added in between the foam layer and a blend layer which contains a fresh resin such as the impact polystyrene.

EXAMPLE 12

A Blend 4, simulating another reclaim mixture of resins, was made using the same resins and the same procedure used to make Blends 1–3 and had the following composition by weight percent of the Blend:

| 61.2% | PS |
|---|---|
| 21.0% | IPS |
| 6.7% | PP |
| 3.7% | LLDPE |
| 2.5% | EVA |
| 1.9% | EVOH |
| 3.0% | GF-20 |

Blend 4 was then coated onto a foam core sheet like those used in Examples 1–5. However, after coating, the outer layer comprising Blend 4 showed cracks and had a marginal appearance, which is unacceptable for packaging applications.

The mechanical properties of Blend 4 were measured. Blend 4 had an elongation at break, measured by ASTM D-256, of 2.6%, which was the lowest elongation at break of any of the Blends examined. Because of the unacceptable performance of Blend 4 compared to that of Blend 2, having an elongation at break of 2.8%, the reclaim material mixture used preferably has an elongation at break above about 2.6%. Although mechanical properties other than elongation at break can be correlated with blend compositions, none of the other mechanical properties appear to correlate with extrusion capability.

EXAMPLE 13

A four major layer sheet as in FIG. 1 and 52.5 inches wide was made with the method of FIG. 2 wherein: layer 11 was the five-layer barrier film layer of Examples 1–5, inner layer 12 was a multi-resin blend impact polystyrene mixture as in Example 11, layer 13 was a polystyrene foam layer as in Example 11, and outer layer 14 was an impact polystyrene layer as in Example 5. In the final sheet, the barrier film layer 11 was 3 mils thick; the IPS/blend inner layer 12 and the IPS outer layer 14 were each 2.5 mils thick; and the polystyrene foam layer 13 was 62 mils thick (the foam layer was 100 mils thick after its extrusion and before coating). The line speed was about 60 ft/min. The IPS/blend and IPS layers were extrusion coated at a temperature of 440° F. Roller 109 was at a temperature of 100° F., and rollers 110 and 111 were at 130° F. The tension rollers were at settings adjusted to the line speed. The sheet produced was wrinkle-free and was thermoformed successfully into packaging trays, having the barrier layer as the contact surface for the packaging content, using conventional thermoforming apparatus.

EXAMPLE 14

Multi-layer sheets according to the invention containing the required level of adhesive resin in the multi-resin layer adjacent the barrier film, were compared with multi-layer sheets which did not contain the prescribed level of adhesive resin. Each of the multi-layer sheets illustrated in this example contained four layers, as follows: A foamed polystyrene core layer; a solid resinous layer comprising impact polystyrene coextruded onto one side of the foamed core layer; a second solid resinous layer comprising impact polystyrene coextruded onto the other side of the foamed core layer; and an EVOH barrier film laminated onto one of the coextruded solid resinous layers. Table 4, below, shows the comparative delamination results for 5 multi-layer sheets wherein the composition of the solid resinous layer was varied. Delamination tendency of the sheets was studied by subjecting the sheets to 120° F. for 8 hours. Delamination results under these conditions were found to be a good basis for predicting the long term lamination stability of the barrier film. Three different barrier films ("A, B and C"), each having a thickness of about 2 to 3 mils, were used in the test as follows:

| | copolymer |
|---|---|
| | Barrier Film A |
| layer one | ethylene-vinyl acetate |
| layer two | low density polyethylene |
| layer three | maleated ethylene vinyl acetate |
| layer four | ethylene vinyl alcohol |
| layer five | maleated ethylene vinyl acetate |
| layer six | low density polyethylene |
| | Barrier film B |
| layer one | ethylene-vinyl acetate |
| layer two | maleated polyolefin |
| layer three | ethylene vinyl alcohol |
| layer four | maleated polyolefin |
| layer five | low density polyethylene |
| | Barrier Film C |
| layer one | ethylene-methyl acrylate |
| layer two | maleated polyolefin |
| layer three | ethylene vinyl alcohol |
| layer four | maleated polyolefin |
| layer five | low density polyethylene |

TABLE 4

| Layer | Wt of Layer (g/100 in$^2$) | Multi-layer Sheet 1 | Multi-Layer Sheet 2 | Multi-Layer Sheet 3 | Multi-layer Sheet 4 | Multi-Layer Sheet 5 |
|---|---|---|---|---|---|---|
| 1 | 3.9 | (Barrier Film) A or B | Barrier Film A or B | Barrier Film A or C | Barrier Film A or C | Barrier Film A or C |
| 2 | 5 | (solid resin layer) 100% HIPS[1] | (solid resin layer) 40% HIPS 60% reclaim[2] | (solid resin layer) 90% HIPS 10% (EMA[4] or EVA[5]) | (solid resin layer) 30% HIPS 60% reclaim 10% EMA | (solid resin layer) 35% HIPS 60% reclaim 5% EMA |
| 3 | 12 | (foam layer) 100% PS[3] | (foam layer) 75% PS 25% reclaim | (foam layer) 100% PS | (foam layer) 75% PS 25% reclaim | (foam layer) 75% PS 25% reclaim |
| 4 | 5 | (solid resin layer) 100% HIPS | (solid resin layer) 40% HIPS 60% reclaim | (solid resin layer) 100% HIPS | (solid resin layer) 40% HIPS 60% reclaim | (solid resin layer) 40% HIPS 60% reclaim |

| | Delamination results after 8 hours at 120° F. | | | | |
|---|---|---|---|---|---|
| | Sheet 1 | Sheet 2 | Sheet 3 | Sheet 4 | Sheet 5 |
| Total Adhesive conc.[6] (wt. % in layer 2) | 0 | 2.2 | 10 | 15.8 | 6.8 |
| Results | severe delamination | occasional delamination | No delamination | No delamination | Minor intermittent delamination[7] |

Notes
1. HIPS is Amoco H1R high impact polystyrene
2. Reclaim in all sheets is scrap obtained from manufacture or processing of the multi-layer sheet (11% LDPE, 3.3% maleated adhesives from barrier film tie-layers, 3.1% EVOH, 6.1% EMA/EVA, 19.5% hips, and 57% crystalline PS)
3. PS is crystalline polystyrene supplied by Amoco, Dow and Mobil.
4. EMA is ethylene methyl acrylate (Chevron SP-2260--24% MA content
5. EVA is ethylene vinyl acetate (Dupon 3170--20% MA content)
6. The total adhesive concentration is based on the combined weight of adhesive resin(s) in layer 2, including adhesive resin introduced through reclaim.
7. Sheet 5 frequency of delamination showed an improvement over the frequency of delamination in Sheet 2.

We claim:

1. A thermoplastic multi-layer sheet comprising:
   (a) a core layer of foamed thermoplastic;
   (b) an oxygen barrier layer comprising a barrier resin selected from the group consisting of (i) copolymers of ethylene vinyl alcohol and (ii) polymers comprising a copolymer of acrylonitrile; and
   (c) a multi-resin first layer adjacent said foamed core layer and said oxygen barrier layer, and comprising from about 5 to about 25 weight percent of at least one adhesive resin selected from the group consisting ethylene-methyl acrylate copolymer; ethylene-vinyl acetate copolymer; styrene-(ethylene-butylene)-styrene copolymer; styrene maleic anhydride copolymer; ethylene-acrylic acid copolymer; styrene-butadiene-styrene copolymer; styrene-isoprene-styrene copolymer; and polybutene;
   wherein said multi-resin layer is sandwiched between said foam core layer and said oxygen barrier layer, and comprises reclaim obtained from manufacturing or processing of said thermoplastic multi-layer sheet.

2. The thermoplastic multi-layer sheet of claim 1 wherein said first multi-resin layer comprises from about 8 to about 16 weight percent of said adhesive resin.

3. The thermoplastic multi-layer sheet of claim 2 wherein said adhesive resin is at least one member selected from the group consisting of ethylene vinyl acetate and ethylene methyl acrylate.

4. The thermoplastic multi-layer sheet of claim 1 wherein said foamed core layer comprises reclaim from manufacturing or processing of said thermoplastic multi-layer sheet.

5. The thermoplastic multi-layer sheet of claim 1 wherein said foamed core layer comprises foamed styrenic resin and said barrier layer comprises ethylene-vinyl alcohol copolymer.

6. The thermoplastic multi-layer sheet of claim 5 wherein the amount of reclaim present in said multi-resin layer is at least about 30 weight percent of said layer.

7. The thermoplastic multi-layer sheet of claim 5 wherein the amount of reclaim present in said first multi-resin layer is at least about 60 weight percent of said layer.

8. The thermoplastic multi-layer sheet of claim 5 comprising a second multi-resin layer which is adhered to said foamed core layer opposite the side thereof to which said first multi-resin layer is adhered and which comprises reclaim obtained from manufacturing or processing of said thermoplastic multi-layer sheet, wherein the combined amount of reclaim in both of said multi-resin layers is at least about 30 percent of the combined weight of said multi-resin layers.

9. The thermoplastic multi-layer sheet of claim 8 wherein the combined amount of reclaim in said multi-resin layers is at least about 60 percent of the combined weight of said multi-resin layers.

10. The thermoplastic multi-layer sheet of claim 5 wherein said foamed core layer comprises reclaim from manufacturing or processing of said thermoplastic multi-layer sheet.

11. The thermoplastic multi-layer sheet of claim 5 wherein said first multi-resin layer comprises about 8 to about 16 weight percent of said adhesive resin.

12. The thermoplastic multi-layer sheet of claim 11 wherein said first multi-resin layer comprises at least one member selected from the group consisting of ethylene vinyl acetate and ethylene methyl acrylate.

13. The thermoplastic multi-layer sheet of claim 12 wherein said first multi-resin layer comprises ethylene methyl acrylate.

14. The thermoplastic multi-layer sheet of claim 12 wherein said first multi-resin layer comprises ethylene vinyl acetate.

15. The thermoplastic multi-layer sheet of claim 12 wherein the barrier layer is a five layer film of thickness of about 2–4 mils consisting of
   a first layer adhered to said first multi-resin layer and comprising an ethylene methyl acrylate copolymer;
   a second layer adhered to said first layer and comprising a maleated polyolefin:
   a third layer adhered to said second layer and comprising an ethylene vinyl alcohol copolymer:
   a fourth layer adhered to said third layer and comprising a maleated polyolefin; and
   a fifth layer adhered to said fourth layer and comprising a low density polyethylene.

16. The thermoplastic multi-layer sheet of claim 12 wherein the barrier layer is a four layer film having thickness of about 2–4 mils consisting of
   a first layer adhered to said first multi-resin layer and comprising a maleated ethylene methyl acrylate copolymer:
   a second layer adhered to said first layer and comprising an ethylene vinyl alcohol copolymer;
   a third layer adhered to said ,second layer and comprising a maleated polyolefin: and
   a fourth layer adhered to said third layer and comprising a low density polyethylene.

17. The thermoplastic multi-layer sheet of claim 15 wherein said adhesive resin of the first multi-resin layer is ethylene methyl acrylate.

18. The thermoplastic multi-layer sheet of claim 15 wherein said foamed core layer comprises reclaim from manufacturing or processing of said thermoplastic multi-layer sheet.

19. The thermoplastic multi-layer sheet of claim 18 wherein said foamed core layer comprises said reclaim and virgin polystyrene, and wherein the reclaim constitutes up to about 40 weight percent of said foamed core layer.

20. The thermoplastic multi-layer sheet of claim 15 wherein said first multi-resin layer contains said reclaim and virgin impact polystyrene, and said reclaim constitutes at least about 30 weight percent of said layer.

21. The thermoplastic multi-layer sheet of claim 20 wherein said reclaim constitutes at least about 60 weight percent of said layer.

22. The thermoplastic multi-layer sheet of claim 15 comprising a second multi-resin layer which is adhered to said foamed core layer opposite the side thereof to which said first multi-resin layer is adhered and which comprises reclaim obtained from manufacturing or processing of said thermoplastic multi-layer sheet, wherein said multi-resin layers comprise said reclaim and virgin impact polystyrene, and wherein the combined amount of reclaim in both of said multi-resin layers is at least about 30 percent of the combined weight of said multi-resin layers.

23. The thermoplastic multi-layer sheet of claim 22 wherein the combined amount of reclaim in said multi-resin layers is at least about 60 percent of the combined weight of both of said multi-resin layers.

24. The thermoplastic multi-layer sheet of claim 12 wherein the barrier layer is a five-layer film having thickness of about 2–4 mils consisting of a first layer adhered to said multi-resin layer and comprising an ethylene vinyl acetate copolymer;

a second layer adhered to said first layer and comprising a maleated polyolefin;

a third layer adhered to said second layer and comprising an ethylene vinyl alcohol copolymer;

a fourth layer adhered to said third layer and comprising a maleated polyolefin: and a fifth layer adhered to said fourth layer and comprising a low density polyethylene.

25. The thermoplastic multi-layer sheet of claim 12 wherein the barrier layer is a four layer film having thickness of about 2–4 mils consisting of a first layer adhered to said multi,resin layer and comprising a maleated ethylene vinyl acetate copolymer;

a second layer adhered to said first layer and comprising an ethylene vinyl alcohol copolymer:

a third layer adhered to said second layer and comprising a maleated polyolefin; and a fourth layer adhered to said third layer and comprising a low density polyethylene.

26. The thermoplastic multi-layer sheet of claim 24 wherein said adhesive resin of the first multi-resin layer is ethylene vinyl acetate.

27. The thermoplastic multi-layer sheet of claim 24 wherein said foamed core layer comprises reclaim from manufacturing or processing of said thermoplastic multi-layer sheet.

28. The thermoplastic multi-layer sheet of claim 27 wherein said foamed core layer comprises said reclaim and virgin polystyrene, and said reclaim constitutes up to about 40 weight percent of said foam core layer.

29. The thermoplastic multi-layer sheet of claim 24 wherein said first multi-resin layer comprises said reclaim and virgin impact polystyrene, and said reclaim constitutes at least about 40 weight percent of said layer.

30. The thermoplastic multi-layer sheet of claim 24 wherein said first multi-resin layer comprises said reclaim and virgin impact polystyrene, and said reclaim constitutes at least about 60 weight percent of said layer.

31. The thermoplastic multi-layer sheet of claim 24 comprising a second multi-resin layer which is adhered to said foamed core layer opposite the side thereof to which said first multi-resin layer is adhered and which comprises reclaim obtained from manufacturing or processing of said thermoplastic multi-layer sheet, wherein said multi-resin layers comprise said reclaim and virgin impact polystyrene, and wherein the combined amount of reclaim in both of said multi-resin layers is at least about 30 percent of the combined weight of said multi-resin layers.

32. The thermoplastic multi-layer sheet of claim 31 wherein the combined amount of reclaim in said multi-resin layers is at least about 60 percent of the combined weight of said multi-resin layers.

33. The thermoplastic multi-layer sheet of claim 12 wherein the barrier layer is a six layer film having thickness of about 2–4 mils consisting of a first layer adhered to said first multi-resin layer and comprising an ethylene vinyl acetate copolymer;

a second layer adhered to said first layer and comprising a low density polyethylene;

a third layer adhered to said second layer and comprising a maleated ethylene vinyl acetate copolymer;

a fourth layer adhered to said third layer and comprising an ethylene vinyl alcohol copolymer;

a fifth layer adhered to said fourth layer and comprising a maleated ethylene vinyl acetate copolymer; and a sixth layer adhered to said fifth layer and comprising a low density polyethylene.

34. The thermoplastic multi-layer sheet of claim 33 wherein said copolymeric resin of the first multi-resin layer is ethylene vinyl acetate.

35. The thermoplastic multi-layer sheet of claim 33 wherein said foamed core layer comprises reclaim from manufacturing or processing of said thermoplastic multi-layer sheet.

36. The thermoplastic multi-layer sheet of claim 35 wherein said foamed core layer comprises said reclaim and virgin polystyrene, and said reclaim constitutes up to about 40 weight percent of said foamed core layer.

37. The thermoplastic multi-layer sheet of claim 33 wherein said multi-resin layer comprises said reclaim and virgin impact polystyrene, and said reclaim constitutes at least about 30 weight percent of said first multi-resin layer.

38. The thermoplastic multi-layer sheet of claim 33 wherein said first multi-resin layer comprises said reclaim and virgin impact polystyrene, and said reclaim constitutes at least about 60 weight percent of said layer.

39. The thermoplastic multi-layer sheet of claim 24 comprising a second multi-resin layer which is adhered to said foamed core layer opposite the side thereof to which said first multi-resin layer is adhered and which comprises reclaim obtained from manufacturing or processing of said thermoplastic multi-layer sheet, wherein said multi-resin layers comprise said reclaim and virgin impact polystyrene, and wherein the combined amount of reclaim in both of said multi-resin layers is at least about 30 percent of the combined weight of said multi-resin layers.

40. The thermoplastic multi-layer sheet of claim 39 wherein the combined amount of reclaim in said multi-resin layers is at least about 60 percent of the combined weight of said multi-resin layers.

41. The thermoplastic multi-layer sheet of claim 12 wherein the barrier film comprises an adhesive layer selected from the group consisting of ethylene vinyl acetate copolymer ethylene methyl acrylate copolymer and maleated derivatives thereof; an ethylene vinyl alcohol copolymer barrier layer; and a styrenic polymer layer.

42. The thermoplastic multi-layer sheet of claim 41 wherein the styrenic layer comprises at least one member selected from the group consisting of impact polystyrene, crystalline polystyrene and styrene maleic anhydride copolymer.

43. A thermoplastic multi-layer sheet comprising:

(a) a core layer of foamed thermoplastic;

(b) an oxygen barrier layer comprising a styrenic resin, and a barrier resin selected from the group consisting of (i) copolymers of ethylene vinyl alcohol and (ii) polymers comprising a copolymer of acrylonitrile; and (c) a multi-resin layer adjacent said foamed core layer and said oxygen barrier layer, and comprising polystyrene and at least one adhesive resin selected from the group consisting of ethylene-methyl acrylate copolymer; ethylene-vinyl acetate copolymer; styrene-(ethylene-butylene)-styrene copolymer; styrene maleic anhydride copolymer; ethylene-acrylic acid copolymer; styrene-butadiene-styrene copolymer; styrene-isoprene-styrene copolymer; and polybutene; wherein said multi-resin layer comprises from about 5 to about 25 weight percent of said adhesive resin; and wherein said multi-resin layer is sandwiched between said foam core layer and said oxygen barrier layer;

said multi-resin layer comprising from about 30 to about 80 weight percent of reclaim obtained from manufacturing or processing of said thermoplastic multi-layer sheet;

and said foam core layer comprising reclaim obtained from manufacturing or processing of said thermoplastic multi-layer sheet in an amount up to about 40 weight percent of said core layer.

44. The multi-layer sheet of claim 43 where the styrenic resin is selected from the group consisting of impact polystyrene, crystalline polystyrene and styrene maleic anhydride copolymer.

* * * * *